June 18, 1929.  E. BELIN  1,718,024

TACHYTELEGRAPHIC MACHINE

Filed Dec. 11, 1925

Inventor
E. Belin
By Robb, Robb & Hill
Attorneys

Patented June 18, 1929.

1,718,024

UNITED STATES PATENT OFFICE.

EDOUARD BELIN, OF PARIS, FRANCE.

TACHYTELEGRAPHIC MACHINE.

Application filed December 11, 1925, Serial No. 74,878, and in France December 17, 1924.

My prior Patent No. 1,175,685, granted March 14, 1916, for "tachytelegraph and teletype machines" describes a means for transmitting signals on a perforated tape over an electric conductor; this method which is extremely rapid was based on producing signals of the same length by sending into the line an electric current of a polarity determined by inserting in the line a positive or negative battery and of a voltage determined by inserting in the line at the transmitting end a suitable number of resistance as well as a certain number of battery elements.

According to this invention which is based upon this type of machine resistances are no longer used at the start; it is in effect materially impossible for a line however good, to retain the same resistance during the time required to send the number of signals required for example for a complete telegram; the addition therefore of resistances of fixed value cannot give any certainty of obtaining the constant variations at the end of the line necessary to give differing signals; this addition in order to remain comparable to itself may further be modified according to the variations of the line.

The practice however of placing the positive or negative pole of the battery in line is retained but currents are sent whose voltage is graduated by inserting a certain number of battery elements and these elements are all identical with the result that at the end of the line the variation received will be proportional to the number of additions provided, whatever may be the value of the resistance of the line.

When the transmitting machine employed is that described in the patent aforesaid i. e. formed of conductive cylinders mounted upon the same axis and insulated from each other, and employing for transmission a perforated tape which passes between these cylinders and conductive brushes in such a manner as to close the circuit between them according to the position of the perforations four perforations are employed for the transmitting of a signal. Further the current is furnished by two batteries one of which is very large and allows the production of a current voltage in multiples of tens and the other smaller forms the addition and delivers 2, 4, 6 or 8 volts. It is therefore possible to send over the line a current of an intensity graduated by fractions of two volts.

If, to give numerical data, the main battery commences at 40 volts and has 120 for its maximum, voltages of 20—32—44— . . . 118—120—122—124—126—128 volts can be sent, i. e. by 45 fractions; and if the polarity is inverted there is a possibility of sending 90 signals of different strengths.

These numbers are only given by way of illustration. In principle the number and the value of each addition will be determined by a number of signals that the transmitter should be able to send and the resistance in the line to be overcome. For 50 signals for example a battery which can furnish five tens and a battery giving the four additions may suffice. The value of the voltages may moreover be fixed in a quite arbitrary manner by the determination of the fractions of one and the other battery; the method should also allow of sending over the line currents of selected voltages for giving finally comparable variations between two signals whatever may be the resistance value of the line.

The invention is illustrated in the accompanying drawing in which the same figures and letters of reference have been adopted as in my co-pending application Serial No. 672,206 filed January 11, 1923.

Figure 1:
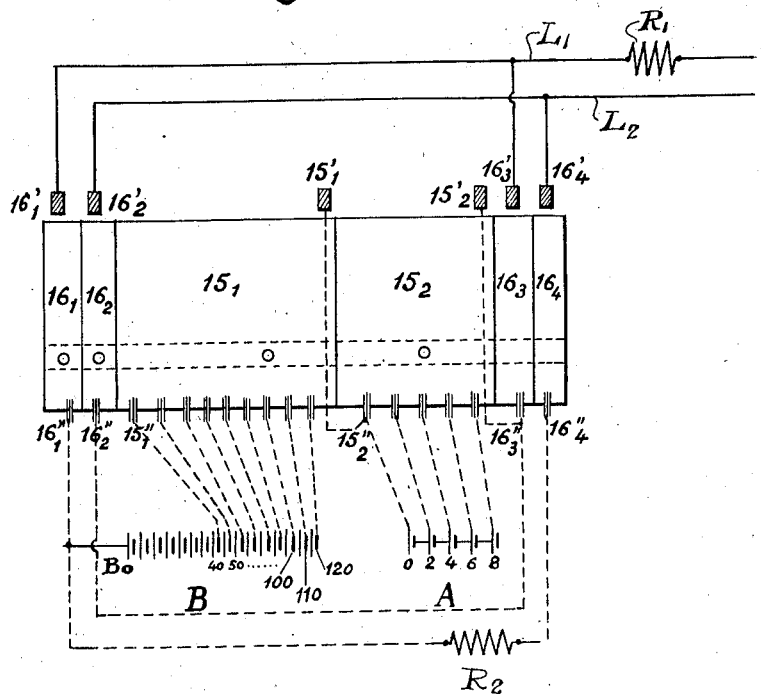
Figure 1 is a plan view of the transmitting apparatus of this invention.

There will be seen four transmitting cylinders 16 for polarity two on the right and two on the left, one large and one smaller cylinder 15 for voltage.

Brushes $16_1''$, $16_2''$, $16_3''$, $16_4''$, connect the first polarity disk $16_1$ to the zero of the large battery B the second disk $16_2$ to the third $16_3$ and the fourth $16_4$ to the first $16_1$.

Brushes $15_1''$ connect the voltage disk $15_1$ to stages of the battery B (here 9 brushes pass to the stages 40, 50 . . . 120).

Brushes $15_2''$ connect the smaller tension disk $15_2$ to the stages of the additional battery A (here 5 brushes pass to the stages 0.2.4.6.8.).

Brushes 16' allow the polarity disks to be connected with the line; $16'_1$ and $16'_3$ to the wire $L_1$ and $16_2'$ and $16_4'$ to the other wire $L_2$.

A brush $15'_1$ connects the large voltage disk $15_1$ with the origin of battery A and a brush $15'_2$ connects the small voltage disk $15_2$ with the bridge formed between the polarity disks $16_2$ and $16_3$ by the interconnected brushes $16''_2$ and $16''_3$.

To take a concrete example, the tape will be supposed to be perforated as shown; it will be seen that current will take the path $B_0 - 16''_1 - 16_1 - 16'_1 - L_1$ and $L_2 - 16'_2 - 16_2 - 16''_2 - 15'_2 - 15_2 - A_4 - A_0 - 15'_1 - 15_1 - B_{100}$.

A current of 104 units will therefore be sent over the line $L_2$ with return by way of $L_1$.

If the polarity holes had been on the right the path would be at $B_0 - 16''_4 - 16_4 - 16'_4 - L_2$ and return $L_1 - 16'_3 - 16_3 - 16''_3 - 15'_2 - 15_2 - A_4 - A_0 - 15'_1 - 15_1 - B_{100}$ i. e. a current starting over $L_1$ with 104 units and returning to zero by $L_2$ which is exactly the reverse of the preceding.

This example serves to show the possible combinations with the tens and voltage units on the one hand and with polarities on the other hand.

It is evident that the value of the resistance of the line will react upon the degree of the deviation of the receiving galvanometer per unit of voltage. But according to the momentary state of the oscillograph arrangement, the effect of the same voltage unit will not be the same for different polarities.

In order to compensate for this difference it is only necessary to introduce into the circuit two additions (resistances or voltages), in the present instance resistances $R_1$ and $R_2$ one in the line $L_1$ the other in the bridge between $B_0$ and $16''_4$. Before transmitting the person transmitting will send a series of impulses of the same value but of opposite sense and the person receiving will see the galvanometer deviate more in one direction than the other. On the indication given the compensation resistances will be adjusted to effect equality and this equality will be maintained so long as the value of the line remains as such. Given rapidity one regulation will practically be sufficient for one transmission, but it may be adjusted periodically or on request when desired.

To ensure the proper functioning of the perforated tape in spite of the rapidity of unwinding and the change of the diameter of the spools the additional improvement following may be employed.

A light counterweight retains an unwinding spool while a substantially heavier weight urges the winding on spool. The motor which effects the rotation of the transmitting cylinder forms in reality a brake on the speed which results from the differences of weight. It will be understood that this motor (connected to the cylinder by appropriate gear) has only to furnish a very small power. This arrangement allows synchronisms to be obtained with ease with the motor which drives (in the same manner or differently) the sensitive receiving tape; the motor may, for example, be of any type of synchronous motor such as the Guillet motor etc.

Figure 2:
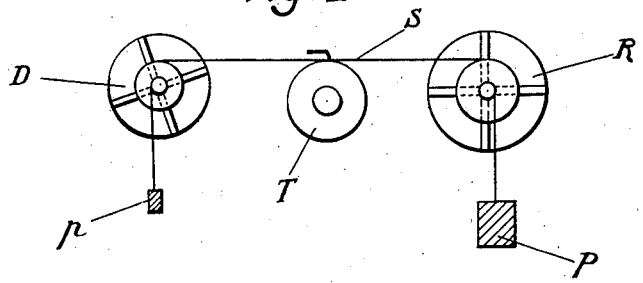
Fig. 2 is a diagram of the tape feed mechanism.

This arrangement is illustrated in the diagram shown in Figure 2 comprising a winding off spool D from which the perforated tape S passes beneath the brushes and over the cylinder T (a friction wheel or a marginal tooth ensuring the action of such cylinder upon the tape) and a winding on drum R; the weights $p$ and P ensure the differential drive described.

If the special application of this ultra-rapid transmission be applied in a teletype machine the letters transmitted should differ from those received a signal should be reserved for effecting a change of alphabet. This signal may for example be the maximum voltage in a predetermined sense. The corresponding perforations will be longer in order that the relays or other operating means may have time to function.

Figure 3:
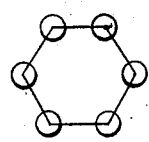
Fig. 3 is a schematic diagram showing the general arrangement of alphabet supports and line justification mirrors to be stepped into operative position.

When this transmitting machine is applied to an optical receiving system as disclosed in my copending application above referred to, wherein a spiral mirror device is interposed in the luminous beam, there may be several such mirror devices corresponding to different alphabets requiring different line justification and so arranged that a signal impulse sent to effect a change of alphabet will act simultaneously upon the alphabet support and the support for the mirror devices to bring an alphabet and its corresponding mirror device into operative position. To effect this operation the supports may be arranged on a circular or rotating carriage as diagrammatically indicated in Fig. 3.

The receiver at the receiving station used in conjunction with the transmission station includes an oscillograph A which receives a beam of light from the source B which beam passes through a condenser C, a diaphragm D and a lens E. This oscillograph is deflected by the transmitter according to the strength and voltage of the current impulses transmitted over the line. The beam of light is reflected by the mirror of the oscillograph onto a scale of letters indicated at F and the rays of light pass through this scale, through the condenser G, the lens H and onto the respective mirrors I of an arcuately arranged system from which mirrors the rays are reflected to a common focal point. At this focal point is arranged a rotative reflector device J which is in the form of a spiral staircase and this reflector device in turn throws the rays upon the sensitized surface K on the cylinder L in such manner that the letters are imposed upon the surface in side by side relation transversely of the cylinder.

It will be understood that in the use of such receiving apparatus it may be necessary to employ different forms of alphabets embodying different sizes of characters and this in turn necessitates the use of mirror devices having a different number of different sizes of reflecting mirrors arranged in a spiral form. In this event it is necessary only to send a proper signal which will cause a shifting of the support carrying the different alphabets and the support carrying the different mirror devices in order to bring about a correspondence between the matter transmitted and that received at the receiving station. This feature is not herein claimed.

Having now particularly described and ascertained the nature of my said invention and in what manner the same is to be performed, I declare that what I claim is:

1. In apparatus for transmitting signals over a line, the combination of a battery of unit sources of current with means for inserting in the line selected source units comprising a plurality of conductive cylinders, certain of which cylinders determining the polarity of the current of any of the units and certain other of said cylinders determining the units, said units being arranged to produce a series of several voltages increasing in arithmetical progression, a set of brushes contacting with the cylinders, a second set of brushes, and a perforated tape interposed between the cylinders and the last mentioned brushes and permitting the contact of said brushes with the cylinders only through the perforations thereof.

2. In apparatus for transmitting signal potential impulses over a line circuit, the combination of a battery of unit sources of current, means for connecting one or more units to the line in one polarity through a given circuit conductor and in the opposite polarity exclusive of said given circuit conductor, electrical adjusting means in the line circuit, and electrical adjusting means in the said given circuit conductor.

In testimony whereof I affix my signature.

EDOUARD BELIN.